June 2, 1959     K. GEBELE     2,888,866
PHOTOGRAPHIC OBJECTIVE SHUTTER

Filed March 7, 1955     3 Sheets-Sheet 1

INVENTOR
KURT GEBELE,
by John B. Brady
ATTORNEY

June 2, 1959  K. GEBELE  2,888,866
PHOTOGRAPHIC OBJECTIVE SHUTTER
Filed March 7, 1955  3 Sheets-Sheet 2

INVENTOR
KURT GEBELE,
by
John B. Brady
ATTORNEY

June 2, 1959     K. GEBELE     2,888,866
PHOTOGRAPHIC OBJECTIVE SHUTTER
Filed March 7, 1955     3 Sheets-Sheet 3

INVENTOR
KURT GEBELE,
by
ATTORNEY

United States Patent Office 2,888,866
Patented June 2, 1959

2,888,866

PHOTOGRAPHIC OBJECTIVE SHUTTER

Kurt Gebele, Munich, Germany, assignor to Hans Deckel and Friedrich Wilhelm Deckel, Munich, Germany Application March 7, 1955, Serial No. 492,541

Claims priority, application Germany March 9, 1954

4 Claims. (Cl. 95—11.5)

This invention relates to a photographic shutter of the objective or between-the-lens type, and more particularly to an objective shutter having a master member or main drive member controlling the shutter blades, and having a built-in pre-timer or delayed action mechanism and a control member which permits the shutter to be set selectively for exposures which are to be made either with or without using said pre-timer.

There have already been known shutter constructions of the type indicated above in which the shutter is selectively set for exposures to be made either with or without using the pre-timer by means of a rotatable control or setting ring, which ring, however, will remain in the selected position after an exposure has been made with the aid of the pre-timer. The fact that the shutter mechanism will not return to its normal position or setting in which exposures are made without using the pre-timer constitutes a serious drawback in that it may easily give rise to erroneous exposures giving faulty results. This drawback is aggravated in those cases, in particular, in which said control member which controls the pre-timer also serves the function of controlling the flashlight contact device, the position of said control member which corresponds to the intended use of the pre-timer being identical with the position used for a flashlight exposure.

An object of the invention is to eliminate the above-mentioned drawback and to provide a photographic shutter which incorporates a pre-timer and which comprises a control member which, after an exposure controlled by the pre-timer has been made, will automatically return to its normal position, i.e. to the position for exposure to be made without the use of the pre-timer. This object is achieved according to the invention by the provision of a locking member or latch member which is adapted to lock said control member in its position for exposures controlleed by the pre-timer, the said locking member remaining in this locking position in relation to said control member until it is disengaged from the latter by a member which is moved while the shutter mechanism is running down, the said control member thereupon being returned by a restoring force to its position for exposures which are not controlled by the pre-timer.

These and other desirable objects may be attained in the manner disclosed as an illustrative embodiment of the invention in the following description and in the accompanying drawings forming part hereof, in which.

Figure 1:
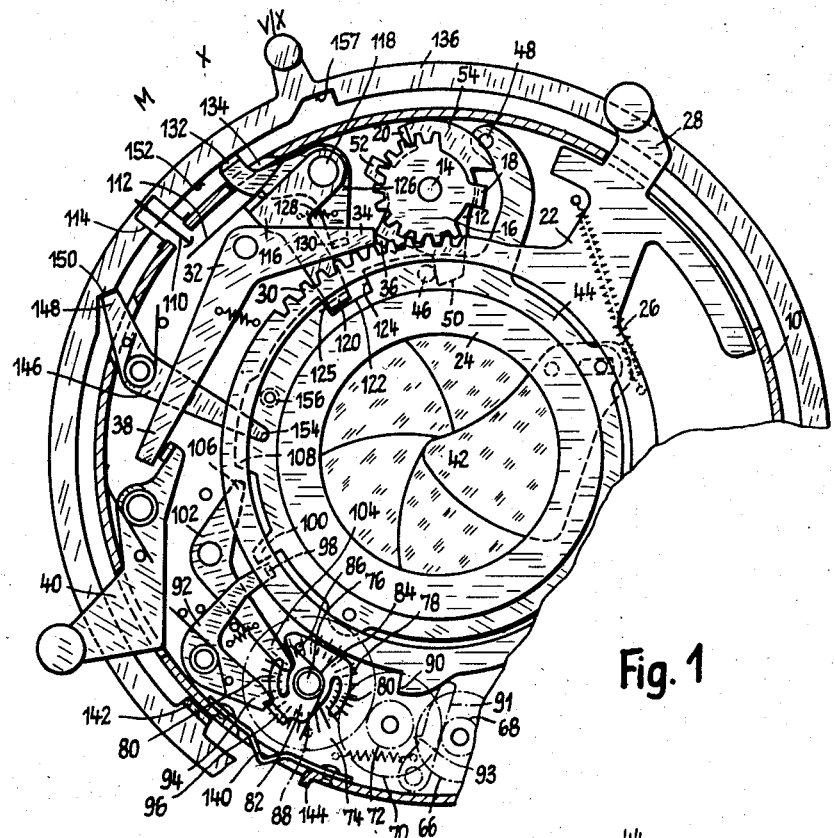
Fig. 1 is a front view of a shutter in accordance with a preferred embodiment of the invention, with the front cover removed to show the parts beneath, with certain parts in section, and with various parts omitted for the sake of clarity, the parts being illustrated in the position which they assume with the shutter tensioned or cocked for an exposure which is to be controlled by the pre-timer.

Referring now to the drawings of the embodiment of the present invention, there is here shown in front face view a photographic shutter of the objective type or between-the-lens type which, except for the changes mentioned below, may be of any conventional construction. For example, the shutter may (except for the mentioned changes) be of the construction available on the market under the trademark "Synchro Compur" manufactured by the Friedrich Deckel firm in Munich, Germany, such shutters being well known and now widely distributed in the United States. Typical details of such a shutter I disclosed in my U.S. patent applications Ser. No. 306,562, now Patent No. 2,785,612, filed August 27, 1952, and Ser. No. 392,685, now abandoned, filed November 17, 1953. Other typical details of such shutters are described and shown in U.S. Patent No. 1,687,123 granted October 9, 1928, for an invention of Deckel and Geiger.

In the drawings of the present invention the shutter casing is indicated in general by the numeral 10. In this casing 10 a main drive member 12 is pivoted about a fulcrum pin 14, said main drive member being influenced or acted upon by a main drive spring (not shown) which tends to rotate the main drive member in a clockwise direction in Fig. 1. Provided for the purpose of tensioning or cocking the main drive member 12 is a toothed tensioning or cocking disk 16 which is freely rotatable about the fulcrum pin 14 in a plane located in front of the plane of the main drive member and has formed therein a lug 18 which is adapted, during the tensioning or cocking operation, to co-operate with a projection 20 of the main drive member 12. The main drive spring is wound or cocked by means of a cocking ring 22 which is mounted for rotation about the lens tube 24 and is acted upon by a spring 26 which tends to maintain said cocking ring in its rest position. For the purpose of rotating the cocking ring 22 in a clockwise direction in order to wind said main drive spring, there is provided on the cocking ring a handle 28. The teeth 30 formed on part of the periphery of the cocking ring 22 are in meshing engagement with the toothing of the cocking disk 16.

For the purpose of locking the main drive member or master member 12 in its cocked position there is provided a double arm locking lever or pawl 32 of which one lever arm 34 is adapted to engage a lug 36 of the master member 12, whereas the other lever arm 38 co-operates with a releasing member or trigger 40.

The shutter blades 42 are operated in known manner by the blade ring 44 which, in turn, is driven by the master member 12. For this purpose the blade ring carriers two pins 46 and 48 which respectively co-operate with the drive cams 50 and 52 formed on the master member 12, the cam 50 serving to move the pin 46 in a counter-clockwise direction so as to open the blades, whereas the cam 52 serves to return the pin 48 in a clockwise direction whereby the blades are closed. The exposure time or shutter speed is controlled by a time-delay escapement mechanism housed within the shutter casing 10 and adapted to co-operate with portion 54 of the master member 12, said escapement mechanism not being shown in the drawings.

Figure 5:
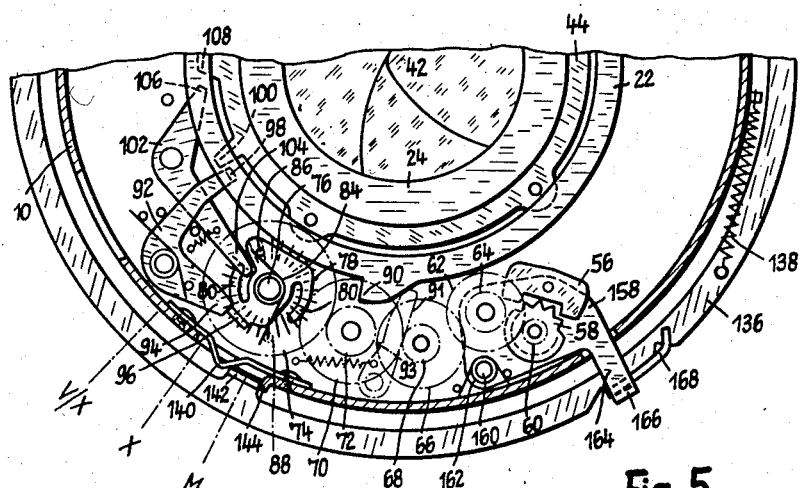
Fig. 5 is a fragmentary front view illustrating the pre-timer mechanism which serves the function of a contact timing mechanism or escapement mechanism.

Also arranged within the shutter casing 10, besides the above-mentioned escapement mechanism co-operating with the master member 12, is a delayed-action or pre-timer mechanism which serves to delay by a suitable interval the running-down action proper of the shutter mechanism in order to render it possible, for example, for the user of the shutter to get into the picture. This pre-timer (Figs. 2, 3 and 5) comprises an escapement anchor or pallet 56 and a star wheel or escapement wheel 58 which co-operates with a train of gear wheels 60 to 74. The upper side of the gear wheel 74 which is rotatable about a pin 76 is in the form of a ratchet wheel with detent notches or serrations 78 which project slightly from the upper side of said gear wheel, these detent notches being engaged by two downwardly bent pawls 80 of a tensioning disk 82 which is mounted for rotation about the same pin 76 as the gear wheel 74 and which overlies the latter. Wound around the pin 76 is a drive spring 84 for the pre-timer, one end of said drive spring abutting against a pin 86 carried by the tensioning disk 82, the other end of said spring resting against a stationary pin 88 secured to a side plate (not shown) overlying the pre-timer mechanism.

The cocking ring 22 serves simultaneously to tension or cock both the pre-timer and the master member 12. For this purpose the cocking ring is formed with a projection 90 which is adapted, when moved in a clockwise direction, to engage the pin 86 carried by the tensioning disk 82 and thus to rotate the latter in a counter-clockwise direction. Upon the drive spring of the pre-timer being tensioned by rotation of the cocking ring 22, a latch lever 91 which overlies part of the pre-timer mechanism and which is maintained in an inoperative position by the projection 90 as long as the cocking ring 22 is in its rest position will engage the gear wheel 72 with its tooth 93 so as to block the pre-timer when the tensioning movement of the tensioning disk begins. One single lever selects the desired mode of operation, viz. (a) flash exposure with delay ("M"), (b) flash exposure without delay ("X") or (c) pre-timer operation ("V/X"). No second lever is required for cocking the pre-timer or flash delay mechanism. The tensioning disk 82 is held in its tensioned position by a locking lever 92 whose arm 94 engages a lug 96 of the tensioning disk 82. The other arm 98 of the locking lever 92 co-operates with a lug 100 provided on the blade ring 44 to disengage the lever arm 94 from the lug 96.

A second double-armed locking lever 102 is pivoted near the locking lever 92. The arm 104 of the locking lever 102 co-operates with the lug 96 of the tensioning disk 82, whereas the other arm 106 of said locking lever co-operates with a locking cam 108 formed on the periphery of the blade ring 44.

The flash contact unit housed within the shutter casing 10 has an insulated contact spring 110 and a movable contact spring 112 (Fig. 4), it being possible, with the aid of a nipple 114, to connect these two contact springs to the flash circuit. The movable contact spring 112 is carried by a contact lever 116 and one end of said contact spring presses against the inner wall of the shutter casing in such a manner as to maintain the contact lever 116, hereafter named X contact lever, in the position shown in Fig. 1. The X contact lever 116 is pivotally mounted at 118 and its arm 120 extends into a recess 122 in the blade ring 44. As soon as the blade ring 44 has been moved in a counter-clockwise direction through an angle sufficient for the edge 124 of the recess 122 to engage the X contact lever 116, 120 and when during continued rotation of the blade ring 44 the X contact lever is rocked about its pivot, the contact spring 112 is pressed against the contact spring 110 to complete the flash circuit. This action occurs at approximately that moment at which the shutter blades 42 are in their fully opened position.

A second double-armed contact lever 126, the so-called M contact lever, is also pivotally mounted at 118. This contact lever is acted upon by a spring 128 which tends to rock the arm 130 of said contact lever in a clockwise direction and thus to engage it with the arm 120 of the X contact lever 116. The other arm 132 of the M contact lever 126 extends outwardly through a slot 134 in the wall of the shutter casing 10 where it co-operates with an annular control member 136. For the sake of clarity, this control member is shown in the drawings as surrounding the shutter arrangement; actually, however, the said control member is mounted, for example, for rotation about the rear lens tube of the shutter casing 10. According to Fig. 2 there is provided a spring 138 one end of which is secured to the control member 136, and said spring tends to rotate the control member in a counter-clockwise direction. Also provided is a detent spring 140 which lies in the path of a lug 142 of the control member 136 and which, together with a limit stop or abutment 144, defines two different positions of the control member 136, these two positions being respectively marked "X" and "M." From its "X" position, the control member 136 can be further rotated in a clockwise direction, against the action of the spring 138, until a position marked "V/X" (Fig. 2) is reached, in which position the control member is locked by a two-armed locking lever 146 which, upon this position of the control member being reached, engages its arm 148 in a detent notch 150 in the control member 136. As long as the control member is either in its "X" position or in its "M" position, the lever arm 148 rests inoperatively against the interior control face 152 of the control member 136. However, with the control member in its "V/X" position, the second arm 154 of the locking lever 146 extends into the path of a control pin 156 carried by the blade ring 44 so that the arm 154 can be rocked by said control pin. When the control member 136 is set at its "M" position, a recess in said member which is provided at 157 is set opposite the arm 132 of the M contact lever 126, the result being that the M contact lever can be effectively rocked for the purpose of closing the flash contact.

Mention may also be made of the fact that part of the pre-timer mechanism serves the function of a contact escapement mechanism controlling the blade ring 44 in such a manner as to delay its effective running-down action after being released and thus also to delay the contact closing action until the delay period necessary for flash units requiring such delay to reach their maximum intensity of illumination (class M flash units) has elapsed. For this purpose the anchor or pallet 56, its associated escapement wheel, and the gear wheeels 60, 62 and 64 are mounted on a separate plate or base member 158 which can be rocked about the pin 160. A spring 162 acts upon the base member 158 in such a manner as to keep the gear wheels 64 and 66 in meshing engagement. An arm 164 which is integral with the base member 158 extends outwardly through an aperture in the shutter casing 10, and a downwardly bent lug 166 on said arm 164 is adapted to be engaged with an inclined projection 168 of the control member 136 in such a manner that the base member 158 is rocked in a clockwise direction against the action of spring 162, the result being that the parts 58 to 64 of the pre-timer mechanism are rendered inoperative.

The function of the shutter just described is as follows:

If it is intended to make an exposure with pre-timing, it is necessary to use the cocking ring 22 to cock both the master member 12 and the pre-timer. Before or after the cocking operation the control member 136 will have to be set at "V/X" so as to render ready for operation the entire pre-timer mechanism 56 to 74. The control member is retained in its "V/X" position by the locking lever 146 so that for the time being the control member cannot return to its normal or "X" position (Fig. 1).

Figure 2:
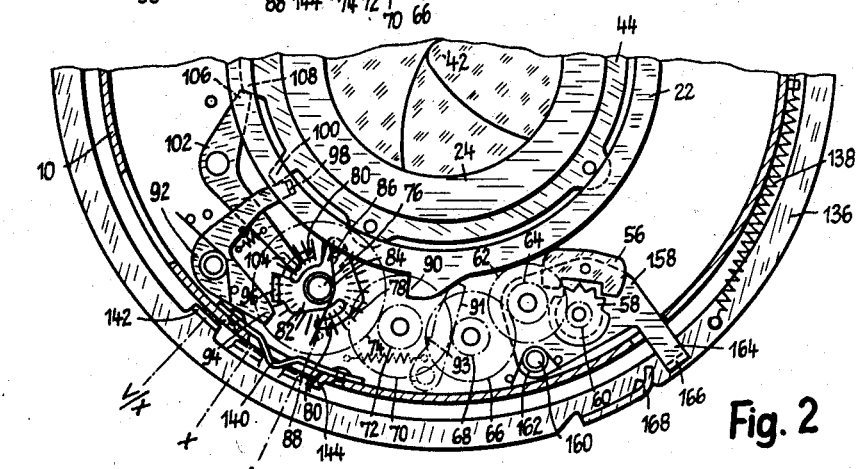
Figs. 2 and 3 are similar views to Fig. 1 and illustrate the same shutter during the running-down operation of the pre-timer and at a moment just before that at which the shutter blades will be opened.
Figures 3, 4:
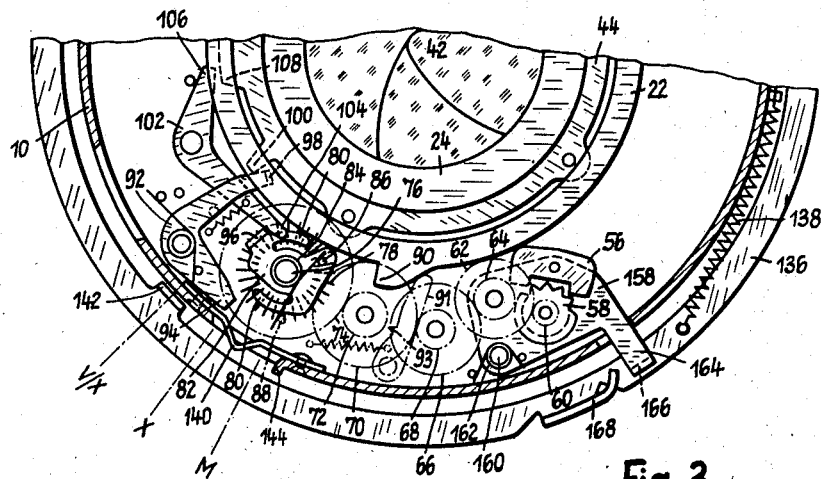
Fig. 4 is a fragmentary front view of the flash contact unit and illustrates said unit in its position for the so-called X synchronization.

Upon the shutter being released by depressing the trigger 40, the master member 12 is released, so that the blade ring 44 is rotated through a small angle in a counter-clockwise direction until it is stopped by the arm 106 of the locking lever 102 engaging the locking cam 108 (Fig. 2). This small angular movement of the blade ring 44 causes the lug 100 of the blade ring to engage and release the arm 98 of locking lever 92 to release the tensioning disk lug 96, permitting the pre-timer to run down. The running-down of the pre-timer takes approximately ten to fifteen seconds. Towards the end of the running-down period of the pre-timer the lug 96 of the tensioning disk 82 actuates the arm 104 of the locking lever 102 (Fig. 3) to release lug 108 of the blade ring 44, permitting the blade ring 44 to complete its running-down movement and thus to cause the blades to be first opened and then closed, this being the final phase of the exposure operation.

As has already been mentioned, the control member 136, when set at "V/X," will be locked in this position by the locking lever 146. Upon the exposure having been made, however, the control member, in a manner provided for by the invention, will be returned to its original normal or "X" position so as to be in readiness at its normal position for the next following exposure. This return motion of the control member 136 is made possible by the fact that during the opening movement of the blade ring the pin 156 carried by the blade ring 44 will rock the arm 154 of the locking lever 146 in a clockwise direction, thus disengaging the arm 148 from the notch 150. Following this the control member 136 is automatically returned to its "X" position by the spring 138, and in doing so the control member with its projection 168 rocks the base member 158 in a clockwise direction, thus automatically rendering inoperative the parts 56 to 64 of the pre-timer mechanism which are not used in delaying the action of the contacts.

The control member 136 is in this case unlocked in the manner already described, i.e. by the locking lever 146 being rocked by a control pin carried by the blade ring, this unlocking action occurring during the opening movement of the latter. It will, however, be understood that this unlocking action could be initiated also at the beginning of the functioning of the shutter, for example by the movement of the releasing trigger. The said locking lever could equally well co-operate with the said master member 12 so as to be unlocked towards the end of the running-down motion of the latter, i.e. towards the end of the running-down operation of the shutter. Generally speaking, the control member 136 may be unlocked by a member which is set in motion during the functioning of the shutter.

In the case of exposures without pre-timing the control member is set at its "X" position. In this position, only the parts 66 to 74 of the pre-timer mechanism can enter into operation, these parts furnishing only a very short delay of approximately 20 milliseconds. Otherwise the parts of the shutter will operate in the manner described earlier. In this case, too, X type flash units may be used for flash exposures.

Figure 6:
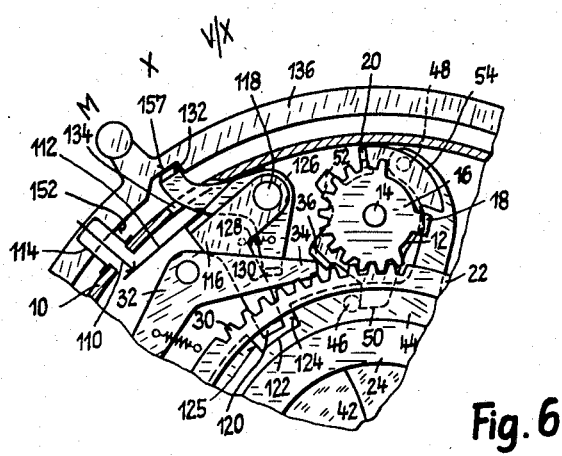
Fig. 6 is a fragmentary front view of the flash contact unit and illustrates said unit in its position for the so-called M synchronization.

If it is intended, on the other hand, to make an exposure without pre-timing and using a flash unit of the M class having a long delay period, the control member 136 will have to be set at its "M" position. In doing so the detent spring 140 will have to be overcome by manual force, the result being that the lug 142 of the control member is brought against the abutment 144. With the control member in this "M" position, the recess 157 of said member will release the M contact lever 126 so that its associated spring 128 can bring the lever 126 to bear on the X contact lever 116, causing the latter again to engage the edge 125 of the recess 122 in the blade ring 44. Also in this case the parts 56 to 64 of the pre-timer mechanism will remain inoperative. Upon the trigger of the shutter being depressed, the edge 125 will be rotated in a counter-clockwise direction for a short angular distance until, during the short initial movement of the blade ring 44, the spring 128 can rock the two contact levers 116 and 126 in a clockwise direction so as to complete the flash circuit (Fig. 6). The actions of releasing the parts 66 to 74 of the pre-timer mechanism serving to delay the operation of the contacts, of stopping the movement of the blade ring 44 by means of the locking lever 102, and of releasing the locking lever 102 to permit continued rotation of the blade ring 44 are all performed in the manner described in the first instance in connection with an exposure without pre-timing, the only exception being that the delay produced by the contact escapement mechanism 66 to 74 is very short, being only approximately 20 milliseconds, the result being that the shutter blades are opened just at that moment at which the flash unit reaches its peak intensity of illumination.

It will be appreciated that with the shutter either cocked or uncocked it is possible, starting from any of the positions "M" or "X," still to set the control member 136 at its "V/X" position, i.e. for an exposure with pre-timing, without in any way affecting the functioning of the shutter or of the flash contact unit.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is this:

1. A photographic shutter comprising a casing, shutter blades movable between closed and open positions in said casing, means for opening and shutting said blades to make an exposure, a pre-timer mechanism coacting with said means for delaying opening of said shutter blades for a substantial time interval after releasing said shutter, comprising a control member for setting said pre-timer mechanism in or out of operative position for the purpose of making exposures with or without time-delay, respectively, a retracting power means tending to hold the control member in the operative position for exposure without time-delay, locking means for locking said control member in the inoperative position for exposure with time-delay, and in which said control member contains a notch and in which there is a movable driven blade ring operatively connected to said shutter blades, a master member driving said blade ring, a control pin fixed on said blade ring, said locking means being a locking lever rotatably mounted in the shuter casing and provided with two lever arms, the first arm engaging in said notch of said control member in the operative position for exposure with time-delay, while the second arm extends in the way of said control pin for the purpose of releasing the locking lever during the opening movement of said blade ring and said shutter blades and means for releasing said locking means whereby the control member automatically returns to its operative position for exposure without time-delay.

2. A photographic objective shutter as defined in claim 1, and comprising a contact device for flash-bulb, a retarding mechanism synchronizing said contact device and forming a disconnectable part of said pre-timer mechanism, the control member for setting the pre-timer also controlling the contact device, whereby said retracting power means automatically serves for setting of said contact device and for disconnecting the other part of said pre-timer mechanism inoperative during the retarding or synchronizing operation.

3. A photographic objective shutter comprising a casing, shutter blades movable between closed and open positions in said casing to make an exposure, a movable driven blade ring operatively connected with said shutter blades, a master member for driving said blade ring, a control pin carried by said blade ring, a pre-timer mechanism for delaying opening of said shutter blades for a substantial time interval after releasing said shutter, a control member for setting said pre-timer mechanism in or out of operative position for the purpose of making exposures with or without time-delay respectively, a retracting power means tending to hold the control member in the operative position for exposure without time-delay, said control member having a notch located therein in the operative position for exposure with time-delay, locking means for locking said control member in the inoperative position for exposure with time-delay, said locking means comprising a locking lever rotatably mounted in the shutter casing, a pair of lever arms on said lever, the first lever arm engaging said notch in said control member in the operative position for exposure with time-delay, while said second arm extends in the path of said control pin on said blade ring for releasing the locking ring during the opening movement of the blade ring and said shutter blades.

4. A photographic objective shutter comprising a casing, shutter blades movable between closed and open positions in said casing, a movable driven blade ring operatively connected with said shutter blades, means for effecting a rundown operation and the driving of said blade ring to move said shuter blades to open position to make an exposure, a control pin carried by said blade ring, a pre-timer mechanism connected with said blade ring for delaying opening of said shutter blades, a control member for setting said pre-timer mechanism in or out of operative position for the purpose of making exposures, a detent notch formed in said control member, a double arm locking lever having one arm projecting through said casing and engageable in the notch in said control member, the other arm of said locking lever projecting into the path of said control pin carried by said blade ring and adapted to establish contact with the last mentioned arm of said locking lever during a rundown operation, said pin being so located with respect to said blade ring and the last mentioned arm of said double arm locking lever and with respect to the notch engagement of the first mentioned arm with the notch in the control member that release of said shutter blades effects displacement of said first mentioned arm and movement of said control member when the rundown operation occurs.

References Cited in the file of this patent

UNITED STATES PATENTS

| | | |
|---|---|---|
| 1,645,929 | Riddell | Oct. 18, 1927 |
| 2,663,233 | Rentschler | Dec. 22, 1953 |

FOREIGN PATENTS

| | | |
|---|---|---|
| 1,094,900 | France | Dec. 15, 1954 |